(12) United States Patent
Kain

(10) Patent No.: US 6,186,707 B1
(45) Date of Patent: Feb. 13, 2001

(54) APPARATUS FOR LOCATING HOLES TO BE DRILLED IN POST CURE COMPOSITE STRUCTURES AND ASSOCIATED METHOD

(75) Inventor: Thomas R. Kain, West Chester, PA (US)

(73) Assignee: The Boeing Company, Seattle, WA (US)

(*) Notice: Under 35 U.S.C. 154(b), the term of this patent shall be extended for 0 days.

(21) Appl. No.: 09/393,838

(22) Filed: Sep. 10, 1999

(51) Int. Cl.⁷ .............................. B23B 35/00; B23B 49/02
(52) U.S. Cl. ..................... 408/1 R; 156/253; 156/510; 408/72 B; 408/75; 408/115 B; 408/241 B
(58) Field of Search ..................... 408/1 R, 72 R, 408/72 B, 241 B, 75, 87, 97, 115 R, 115 B; 156/245, 253, 510

(56) References Cited

U.S. PATENT DOCUMENTS

| | | | |
|---|---|---|---|
| 3,981,604 | * 9/1976 | Cenis | ................................. 408/72 B |
| 4,087,137 | 5/1978 | Voitas . | |
| 4,169,637 | 10/1979 | Voitas . | |
| 4,696,711 | * 9/1987 | Greszczuk | ........................... 156/245 |
| 4,978,255 | * 12/1990 | Gale et al. | ........................... 408/1 R |
| 5,358,361 | 10/1994 | Jurski . | |
| 5,395,187 | 3/1995 | Slesinski et al. . | |
| 5,482,411 | 1/1996 | McGlasson . | |
| 5,807,037 | 9/1998 | Schneider et al. . | |

* cited by examiner

*Primary Examiner*—Steven C. Bishop
(74) *Attorney, Agent, or Firm*—Alston & Bird LLP

(57) ABSTRACT

An apparatus is provided for locating holes to be drilled in a post-cure composite structure, generally comprising a drill boss defining a bore, a bonding fixture defining at least one hole, wherein one surface of the bonding fixture defines the shape of the composite structure to be formed, and the opposing surface thereto engages the drill boss such that the drill boss is aligned with respect to the hole through the bonding fixture. A drill bushing defining a bore is further concentrically disposed within the hole in the bonding fixture and the drill boss bore such that a hole can be drilled in the composite structure by inserting a drill bit through the drill boss bore and the drill bushing bore. In addition, the drill bushing extends between the hole in the bonding fixture and the drill boss bore, wherein the drill bushing bore is adapted to receive a drill bit of a predetermined size for drilling the hole in the composite structure. The drill boss is typically welded or otherwise bonded to the surface of the bonding fixture and configured such that it may receive and retain a cap for hermetically sealing the drill boss bore. Further, the configuration of the drill boss allows an external vacuum source to be connected thereto.

19 Claims, 3 Drawing Sheets

APPARATUS FOR LOCATING HOLES TO BE DRILLED IN POST CURE COMPOSITE STRUCTURES AND ASSOCIATED METHOD

FIELD OF THE INVENTION

The present invention relates to the production of molded articles and, more particularly, to an apparatus and associated method for locating holes to be drilled in post-cure composite structures.

BACKGROUND OF THE INVENTION

The production of molded articles from resinous fiber materials, for example, airplane fuselage components, is typically subject to various limitations. For instance, it is often more convenient to perform processes on a composite structure after the composite structure has been formed and cured on a bonding fixture and remains affixed thereto, than after removing the composite structure from the bonding fixture. For example, holes must often be drilled within the molded composite structure, wherein the holes are used to align, coordinate, or attach the composite structure to other tools or parts in the manufacturing process. However, current post-cure drill processes are typically limited to drilling holes in or near the part excess while the composite structure remains affixed to the bonding fixture. The part excess comprises the parts of the molded composite structure which are outside the final dimensions of the finished part.

In a typical drilling process, a drill boss is attached to the face of the bonding fixture on which the part is formed in a location in or near the part excess area. A drill bar having a drill bushing installed therein is then mounted on to the drill boss on the tool such that the drill bushing extends over the formed and cured composite structure and establishes the position of the hole to be drilled. A special drill bit with a predetermined length is then inserted through the drill bushing in order to drill the hole. The holes in the part excess generally serve as reference points. Subsequent drilling processes for creating additional engineering coordinating holes in the finished part often requires a complex and expensive secondary drill fixture that indexes from the previously drilled holes which were drilled in the part excess while the post-cure part was still affixed to the bonding fixture.

The current post-cure drill process also has the potential to create a mislocated or out of tolerance hole in certain situations. For instance, during the molding procedure, the composite structure must be sealed to the surface of the bonding fixture with a vacuum bag during the curing process. In order to drill the holes in the finished part, the vacuum bag must ordinarily be removed from the part before the holes are drilled. However, removal of the vacuum bag creates a risk of the part or panel demolding or partially releasing from the bonding fixture. If demolding of the part occurs, the process operator must then reposition the part onto the bonding fixture in a "best fit" position. Since the part has been moved with respect to the bonding fixture, the subsequent drilling process may produce a hole which is misaligned or out of tolerance. Further, where the drill bar is mounted to the drill boss, the drill bar must be flatly seated onto the drill boss and properly aligned prior to the drilling process. If the bar is not positioned correctly onto the boss, an out of tolerance hole will be created. In addition, the length of the bar is typically limited to approximately three to four inches around the part excess in order to produce the required accuracy of the drilled hole. Drill fixtures for extending beyond the part excess and onto the actual part often are complex and costly. Secondary drill fixtures must often be developed which index from a previously drilled hole or set of holes, thereby reducing the accuracy of the location of the final drilled hole.

Another limitation of the current post-cure drill process results from the close proximity of the drill boss attached to the bonding fixture in relation to the part excess. This close proximity often results in resin from the composite molding process migrating around the boss. Thus, subsequent attempts to remove the composite structure and/or the excess resin may possibly cause failure of the weld or solder attaching the boss to the bonding fixture. If the drill boss breaks away from the bonding fixture, the desired hole must be located in the composite structure using a manual layout operation, which also carries a risk of producing a mislocated hole. In addition, a lot of time and labor may be spent in replacing the boss and reworking the bonding fixture.

One approach to resolving the current shortcomings of the existing post-cure drill process involves concerted operator training such that there is awareness of the proper procedures to be followed. However, even proper training and awareness may not serve to resolve the problems of the current process. Thus, there exists a need for a post-cure drill process for a formed composite structure which may be performed with minimal risk of the part or panel demolding or partially releasing from the bonding fixture as the holes are drilled. Further, the apparatus used to perform the procedure should not require assembly or complex alignment prior to drilling the holes. In addition, the apparatus should preferably allow holes to be drilled at any desired position in the composite structure without being limited to close proximity about the part excess. Also, the apparatus should provide that, even in the event of separation from the bonding fixture, that the hole may still be drilled in the composite structure without a complex manual layout operation. Further, it would be desirable for the apparatus to have limited, if any, contact with the resin used to form the composite structure.

SUMMARY OF THE INVENTION

The above and other needs are met by the present invention which, in one embodiment, provides an apparatus for locating holes to be drilled in a post-cure composite structure. The apparatus generally comprises a drill boss defining a bore, a bonding fixture defining at least one hole, wherein one surface of the bonding fixture defines the shape of the composite structure to be formed, and the opposing surface thereto engages the drill boss such that the drill boss is aligned with respect to the hole through the bonding fixture. The apparatus can also include a drill bushing defining a bore that is concentrically disposed within the hole in the bonding fixture and the drill boss bore such that a hole can be drilled in the composite structure by inserting a drill bit through the drill boss bore and the drill bushing bore. In addition, the drill bushing extends between the hole in the bonding fixture and the drill boss bore and is adapted to receive a drill bit of a predetermined size for drilling the hole in the composite structure. The drill boss is typically welded or otherwise bonded to the surface of the bonding fixture. The drill boss is further configured such that it may receive and retain a cap for sealing the drill boss bore. Further, the configuration of the drill boss allows an external vacuum source to be connected thereto.

According to one advantageous embodiment of the present invention, a method is provided for fabricating a bonding fixture that facilitates holes to be drilled in a post-cure composite structure formed on the surface of a bonding fixture. According to this method, at least one hole is formed through the bonding fixture in the location and orientation desired of the corresponding hole through the composite structure. A drill boss is then coupled to the surface of the bonding fixture opposite the surface on which the composite structure is formed. The drill boss is coupled to the bonding fixture such that the bore defined by the drill boss is aligned with the hole defined by the bonding fixture such that a hole can be drilled in the composite structure by inserting a drill bit therethrough. A step pin may be further used to align the drill boss bore with the hole in the bonding fixture, wherein the drill boss may be coupled to the bonding fixture by welding or adhesive bonding. A drill bushing may then be concentrically disposed within the hole in the bonding fixture and the drill boss bore such that the drill bushing extends therebetween. Preferably, the drill bushing is press fit into the hole in the bonding fixture and the drill boss bore.

Another advantageous embodiment of the present invention comprises a method for drilling holes in a post-cure composite structure formed on a surface of a bonding fixture. First, a bonding fixture is provided which serves as a template for locating holes to be drilled in the composite structure formed on a surface thereof. The bonding fixture defines at least one hole, and has a first surface which defines the shape of the composite structure, and an opposing surface thereto. The bonding fixture further includes a drill boss mounted to the opposing surface and defining a bore aligned with the hole in the bonding fixture. A composite structure is then formed on the first surface of the bonding fixture so as to take the shape imparted by the first surface of the bonding fixture. A drill bit is then inserted through the drill boss bore such that the drill bit also extends through the hole in the bonding fixture. A hole is then drilled in the composite structure using the drill bit. Preferably, the bonding fixture further includes a drill bushing concentrically disposed within and extending between the hole in the bonding fixture and the drill boss bore for more precisely guiding the drill bit to the composite structure.

Thus, embodiments of the present invention provide an apparatus and associated method for locating and drilling holes in a post-cure composite structure which advantageously minimizes the occurrence of misaligned or out of tolerance holes drilled in the composite structure. Another advantageous aspect of the present invention is that, since the holes are drilled from the back side of the bonding fixture, the vacuum bag does not need to be removed from the post-cure composite structure prior to drilling the holes. Further, assembly and complex alignment of the apparatus used to drill the hole is not required since the present invention provides for proper alignment and orientation of the apparatus for drilling the hole prior to the composite structure being formed on the bonding fixture. In addition, another advantageous aspect of the present invention is that the drill boss is attached to the bonding fixture on a surface opposite the surface on which the composite structure is formed, thus isolating the drill boss from the resin used to form the composite structure and minimizing the risk of damage to the drill boss during the molding process.

BRIEF DESCRIPTION OF THE DRAWINGS

Some of the advantages of the present invention having been stated, others will appear as the description proceeds, when considered in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
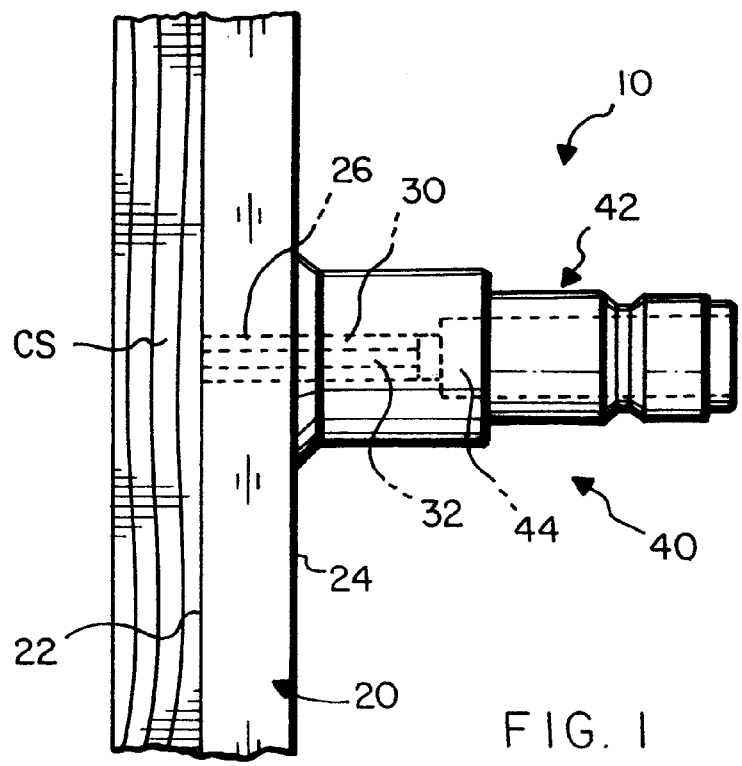
FIG. 1 is a fragmentary longitudinal cross-sectional view illustrating a drill boss affixed to a surface of a bonding fixture opposite the surface on which the composite structure is formed according to one embodiment of the present invention with a drill bushing extending between the hole in the bonding fixture and the drill bushing bore.

FIG. 1 discloses an apparatus for locating holes to be drilled in a post-cure composite structure formed on a surface of a bonding fixture in accordance with one embodiment of the present invention, and indicated generally by the numeral 10. The apparatus 10 generally comprises a bonding fixture 20, a drill bushing 30, and a drill boss 40. The bonding fixture 20 comprises a first surface 22 on which a composite structure CS is formed, the first surface defining and imparting a shape to the composite structure CS formed thereon. The bonding fixture 20 further includes an opposing surface 24 or the "back" side of the bonding fixture 20. Further, the bonding fixture 20 may be formed of, for example, steel, nickel, an iron-nickel alloy, fiber/epoxy resin systems, or any other material compatible with the composite structure being formed and having suitable durability and structural integrity. In some embodiments of the present invention, the bonding fixture 20 may be comprised of, for instance, INVAR™, an iron-nickel alloy produced by C. T. E. Tooling, Akron, OH. In addition, the bonding fixture 20 may be used to form, for example, aircraft fuselage parts from carbon epoxy systems generally comprising a carbon fiber cloth and associated epoxy resin.

The bonding fixture 20 further defines at least one hole 26 which extends from the first surface 22 to the opposing surface 24. For example, a hole 26 may be formed in the bonding fixture 20 such that its location corresponds to the location of a hole to be drilled in the composite structure CS formed on the bonding fixture 20. As shown, one hole need not be in the part excess, but can be aligned with a portion of the actual part. Disposed within the hole 26 in the bonding fixture 20 is a drill bushing 30. The drill bushing 30 is concentrically disposed in the hole 26 in the bonding fixture 20. For example, the drill bushing 30 may be press fit into the hole 26. The drill bushing 30 further defines a bore 32 extending therethrough. The bore 32 is sized such that a drill bit (not shown) corresponding in size to the hole to be drilled in the composite structure may be inserted therein. The length of the bore 32 also assures that the drill bit inserted therein will be guided to drill the hole in the composite structure CS in the desired orientation and allows the precise location of the hole in the composite structure CS to be determined. The drill bushing 30 may be formed of, for example, steel or any other material sufficient to guide and position the drill bit while being adequately durable to resist wear during the drilling operation.

Figure 2:
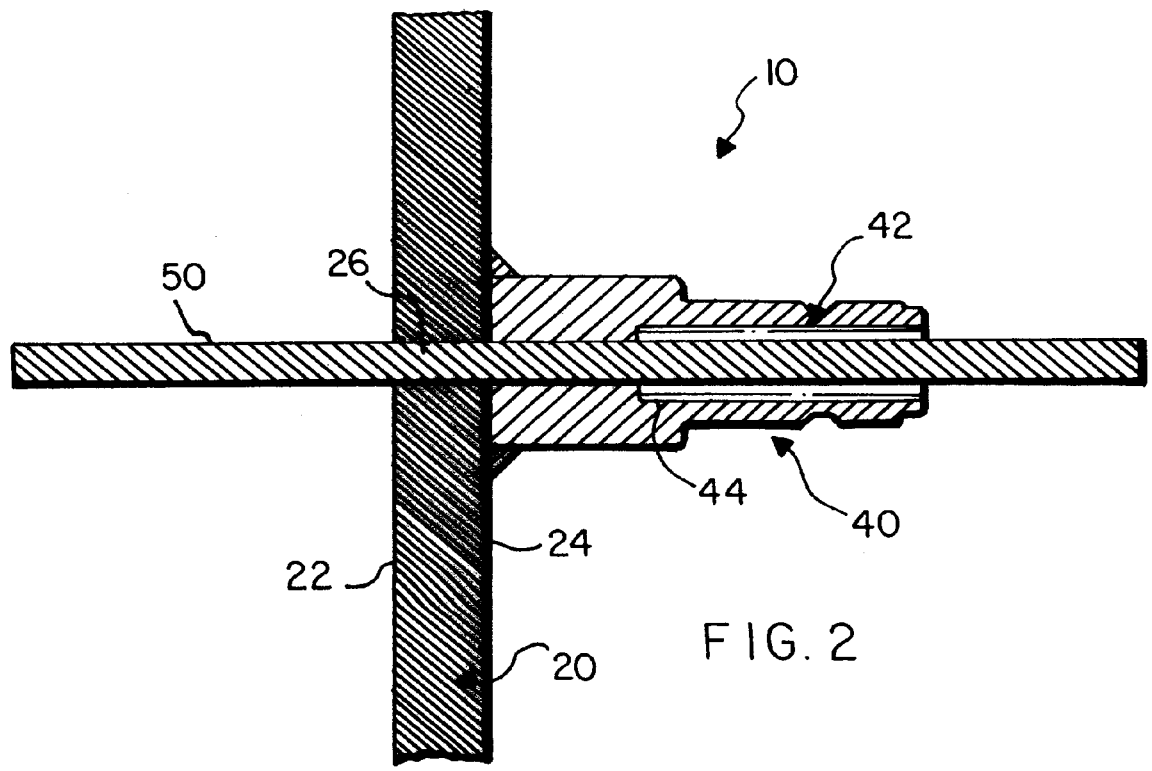
FIG. 2 is a fragmentary longitudinal cross-sectional view of a drill boss attached to a surface of a bonding fixture with a step pin extending through a hole in the bonding fixture and a bore within the drill boss in order to properly align the drill boss bore with the hole in the bonding fixture prior to the drill boss being welded to the bonding fixture.

Engaging both the drill bushing 30 and the bonding fixture 20 is a drill boss 40 formed of, for example, stainless steel, a iron-nickel alloy, or another suitable material. In some embodiments of the present invention, the drill boss 40 may be comprised of, for instance, INVAR™, an iron-nickel alloy produced by C. T. E. Tooling, Akron, OH. The drill boss 40 may further comprise, for example, a weldment that has an industry standard head 42 on one end. In some embodiments of the present invention, the head 42 may comprise, for instance, a Model No. SST-N4M nipple produced by Parker Fluid Connectors—Quick Coupling Division, Minneapolis, Minn. The drill boss 40 further includes a bore 44 therethrough sufficient to allow a drill bit to be inserted therein. At the end of the drill boss 40 opposite the head 42, the drill boss bore 44 is configured to provide an interference fit with the drill bushing 30. The drill boss bore 44 thus engages the drill bushing 30 by press fitting such that the drill boss 40 engages the bonding fixture 20 and the drill bushing extends between the hole 26 in the bonding fixture 20 and the drill boss bore 44. In one embodiment of the present invention, the drill boss 40 may be assembled with the bonding fixture 20 and the drill bushing 30 prior to the drill boss 40 being coupled to the bonding fixture 20, for example, by welding or adhesive bonding. In an alternative embodiment, as shown in FIG. 2, a step pin 50 may be used to align the hole 26 and the bonding fixture 20 and the drill boss bore 44 by extending therebetween in a precision fit with both the hole 26 and the bore 44. With the step pin 50 providing the proper alignment, the drill boss 40 may be welded or otherwise bonded to the bonding fixture 20. Once the step pin 50 is removed following the welding or adhesive bonding process, the drill bushing 30 can be inserted into the hole 26 and the bore 44, for instance, by press fitting.

Figure 3:
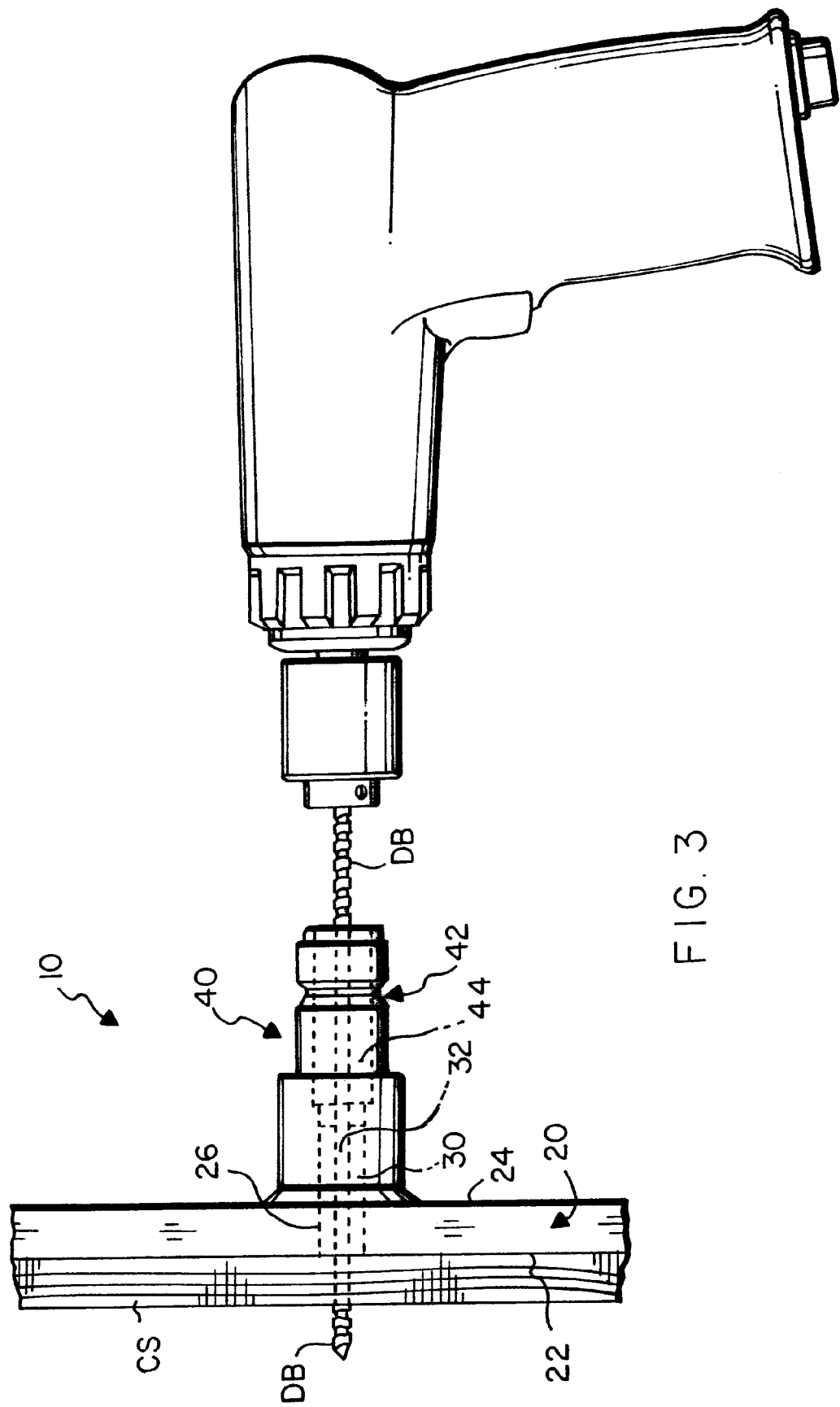
FIG. 3 is a fragmentary longitudinal cross-sectional view of a drill boss welded to a surface of a bonding fixture according to one embodiment of the present invention, wherein a drill bit is inserted through the drill boss bore and the drill bushing bore to drill a hole through the composite structure.

Once assembled, as shown in FIG. 3, the drill boss bore 44 serves to guide a drill bit into the drill bushing bore 32, wherein the drill bushing bore 32 further guides the drill bit through the hole 26 in the bonding fixture 20 to drill the desired hole in the composite structure CS, following curing of the composite structure. Further, by welding or otherwise bonding the drill boss 40 to the bonding fixture 20, the drill bushing 30 is protected from any accidental damage. However, even if the drill boss 40 is damaged and/or separated from the bonding fixture 20, the desired hole may still be drilled with the desired accuracy through the drill bushing bore 32 without realigning the composite structure CS, without relocating the hole to be drilled, and without immediately reworking bond of the drill boss 40 to bonding fixture 20.

Figure 4A:
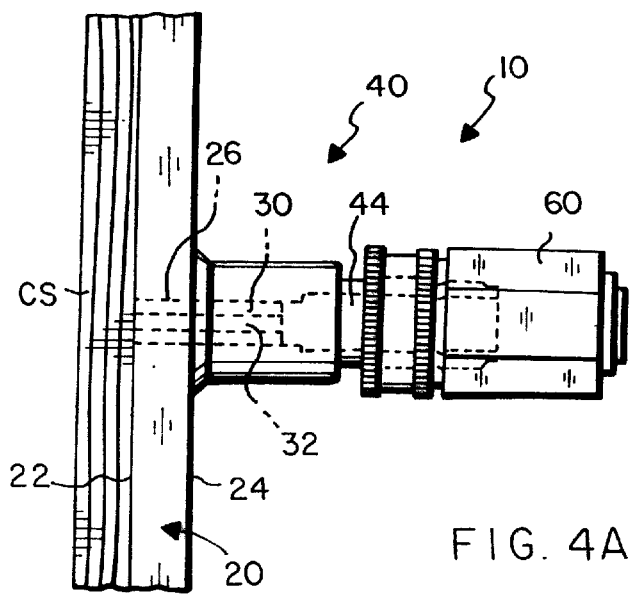
FIG. 4A is a fragmentary longitudinal cross-sectional view of a drill boss welded to a surface of a bonding fixture according to one embodiment of the present invention, wherein a cap is coupled to the drill boss to hermetically seal the drill boss bore.
Figure 4B:
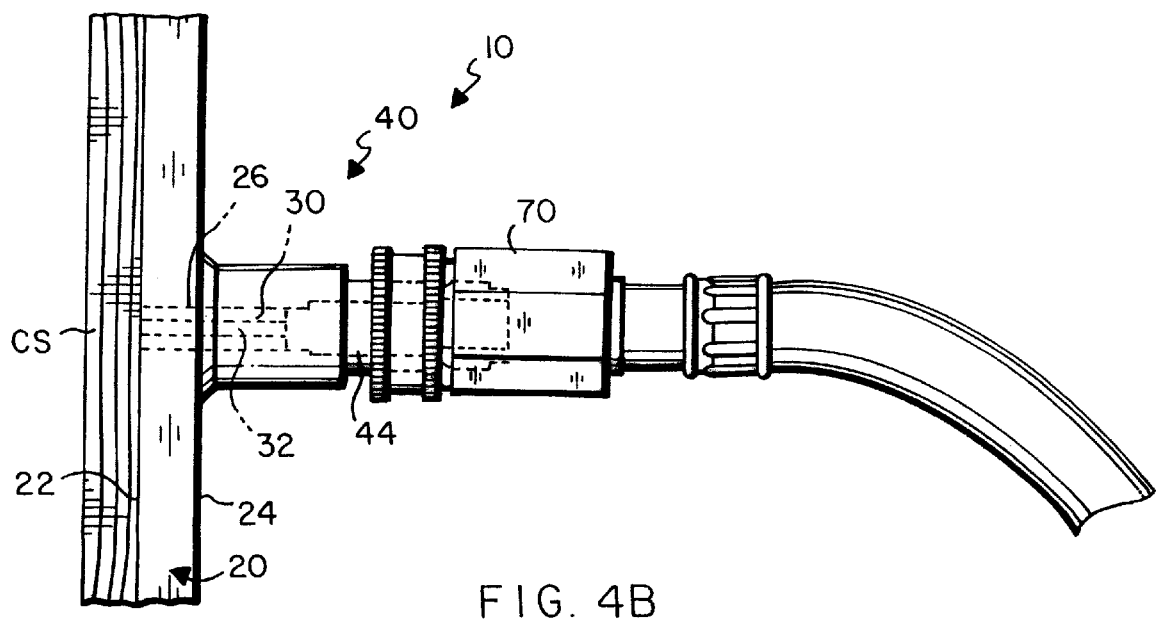
FIG. 4B is a fragmentary longitudinal cross-sectional view of a drill boss welded to a surface of a bonding fixture according to one embodiment of the present invention, wherein an external vacuum source is coupled to the drill boss.

As shown in FIGS. 4A and 4B, the industry standard head 42 of the drill boss 40 also allows a corresponding cap 60 and/or a standard connector 70 to be connected thereto, wherein the connector 70 may comprise, for instance, a quick disconnect fitting such as, for example, a Model No. SST-4 connector (produced by Parker Fluid Connectors—Quick Coupling Division, Minneapolis, Minn.) corresponding to the Model No. SST-N4M nipple comprising the head 42. Sealing the connector 70 with, for example, a ½ inch stainless steel, countersunk hex, pipe thread plug produces a corresponding cap 60 for sealing the drill boss 40.

During the curing process for the composite structure CS, the composite structure CS is sealed to the bonding fixture 20 by a vacuum bag (not shown) and a vacuum is then pulled in the enclosed space. The presence of the drill bushing 30 and the drill boss 40 at the hole 26 in the bonding fixture thus disturbs the vacuum integrity of the bonding fixture 20. Therefore, as shown in FIG. 4A, the cap 60 is configured to mate with the head 42 of the drill boss 40 such that the drill boss bore 44 is hermetically sealed, thereby preserving the vacuum integrity of the bonding fixture 20 during the curing process.

Further, following the curing process, the cap 60 may be removed from the drill boss 40 such that the desired holes may be drilled in the composite structure CS through the drill boss 40. In addition, where the bonding fixture 20 includes multiple holes 26 for drilling corresponding holes in the composite structure CS, multiple drill bushings 30 and drill bosses 40 may be affixed to the bonding fixture 20. Thus, as shown in FIG. 4B, while one hole is being drilled in the composite structure CS through one of the drill boss 40 and drill bushing 30 assemblies, a cap or caps 60 may be removed from the other drill boss(es) 40 and appropriate connectors 70 used to connect a vacuum source thereto. Thus, while a hole in the composite structure CS is being drilled through one or more of the drill bosses 40, the vacuum source acts through one or more of the remaining drill bosses to hold the composite structure CS firmly to the bonding fixture 20.

Thus, embodiments of the present invention advantageously allow holes to be drilled in a post-cure molded composite structure CS. The holes may be drilled while the composite structure CS remains affixed to the bonding fixture 20 and the vacuum bag that holds the composite structure CS to the bonding fixture 20 in the curing process remains thereover. Since the holes are drilled from the side of the bonding fixture 20 opposite the side on which the composite structure CS is formed, holes used for coordination and alignment between tools or between parts may be formed without removing the vacuum bag, thereby lessening the risk of the part demolding or partially releasing from the bonding fixture 20. Further, the apparatus of the present invention can have a drill boss 40 with an industry standard head 42 to allow a vacuum supply to be connected to the drill boss 40 to retain the composite structure CS in intimate contact with the surface 22 of the bonding fixture 20 during the drilling procedure. In addition, the industry standard head 42 on the drill boss 40 allows a cap 60 to be placed thereon to hermetically seal the drill boss bore 44 and maintain the vacuum integrity of the bonding fixture 20 during the curing process.

Still further, since the drill boss 40 according to a particularly advantageous embodiment of the present invention is attached to the side 24 of the bonding fixture 20 opposite the side 22 on which the composite structure CS is formed, the lack of contact between the drill boss 40 and the resin of the composite structure CS virtually eliminates the risk of weld or adhesive bond failure between the drill boss 40 and the bonding fixture 20, thus eliminating down time of the bonding fixture 20 due to replacement of a broken drill boss 40. The present invention further advantageously eliminates the need for drill bars to locate the required holes from a remote drill boss located at or near the part excess, and further eliminates the need for costly secondary drill fixtures for indexing subsequent holes in the composite structure from the previously drilled hole(s), thus improving the accuracy of the holes drilled in the composite structure CS since secondary alignment and drilling operations are eliminated.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for locating holes to be drilled in a post-cure composite structure, said apparatus comprising:
   a drill boss defining a bore;
   a bonding fixture defining at least one hole, said bonding fixture having a first surface which defines a shape of said composite structure and an opposing surface engaging said drill boss such that the drill boss bore is aligned with said at least one hole; and
   a drill bushing defining a bore and concentrically disposed within said at least one hole and the drill boss bore such that a hole can be drilled in the composite structure by inserting a drill bit through said drill boss bore and said drill bushing bore.

2. An apparatus according to claim 1 wherein the drill boss is adapted to be connected to a vacuum source.

3. An apparatus according to claim 1 further comprising a cap mounted upon said drill boss for sealing the drill boss bore.

4. An apparatus according to claim 1 wherein the drill boss is operably connected to the opposing surface of the bonding fixture by at least one of welding and adhesive bonding.

5. An apparatus according to claim 1 wherein the drill bushing extends between said at least one hole and the drill boss bore.

6. An apparatus according to claim 1 wherein the drill bushing bore is adapted to receive a drill bit of a predetermined size for drilling said hole in the composite structure.

7. An apparatus for locating holes to be drilled in a post-cure composite structure, said apparatus comprising:
   a bonding fixture defining at least one hole, said bonding fixture having a first surface which defines a shape of said composite structure and an opposing surface; and
   a drill boss mounted to the opposing surface of said bonding fixture, said drill boss defining a bore aligned with said at least one hole defined by the bonding fixture such that a hole can be drilled in the composite structure by inserting a drill bit through said drill boss bore and said at least one hole defined by said bonding fixture.

8. An apparatus according to claim 7 wherein the drill boss is adapted to be connected to a vacuum source.

9. An apparatus according to claim 7 further comprising a cap mounted upon said drill boss for sealing the drill boss bore.

10. An apparatus according to claim 7 wherein the drill boss is operably connected to the opposing surface of the bonding fixture by at least one of welding and adhesive bonding.

11. An apparatus according to claim 7 further comprising a drill bushing defining a bore and concentrically disposed within and extending between said at least one hole defined by the bonding fixture and the drill boss bore.

12. An apparatus according to claim 11 wherein the drill bushing bore is adapted to receive a drill bit of a predetermined size for drilling said hole in the composite structure.

13. A method for fabricating a bonding fixture that facilitates drilling of holes in a post-cure composite structure formed on a first surface of the bonding fixture, said method comprising the steps of:
   forming at least one hole through the bonding fixture; and
   coupling a drill boss to a surface of the bonding fixture opposite the first surface, said coupling step comprising coupling the drill boss to the bonding fixture such that a bore defined by the drill boss is aligned with said at least one hole defined by the bonding fixture such that a hole can be drilled in the composite structure by inserting a drill bit through said drill boss bore and said at least one hole defined by said bonding fixture.

14. A method according to claim 13 further including the step of inserting a step pin through said at least one hole and the drill boss bore to facilitate alignment therebetween before the coupling step.

15. A method according to claim 13 wherein the coupling step further comprises operably connecting the drill boss to the bonding fixture by at least one of welding and adhesive bonding.

16. A method according to claim 13 further comprising a step of concentrically disposing a drill bushing within said at least one hole defined by the bonding fixture and the drill boss bore such that said drill bushing extends therebetween.

17. A method according to claim 16 wherein said disposing step comprises press fitting the drill bushing into said at least one hole defined by the bonding fixture and the drill boss bore.

18. A method for drilling holes in a post-cure composite structure formed on a first surface of a bonding fixture, said method comprising the steps of:
   providing a bonding fixture that serves as a template for locating holes to be drilled in the composite structure, the bonding fixture defining at least one hole and having a first surface which defines a shape of the composite structure and an opposing surface, the bonding fixture also including a drill boss mounted to said opposing surface and defining a bore aligned with the respective hole defined by the bonding fixture;
   forming a composite structure having the shape imparted by the first surface of the bonding fixture;
   inserting a drill bit through said drill boss bore such that said drill bit also extends through the hole defined by the bonding fixture; and
   drilling a hole in the composite structure with said drill bit.

19. A method according to claim 18 wherein said providing step comprises providing a bonding fixture that further comprises a drill bushing concentrically disposed within and extending between said at least one hole defined by the bonding fixture and the drill boss bore.

* * * * *